Aug. 6, 1940.                C. OMAN                2,210,685
                             AMMETER
                       Filed Aug. 25, 1938
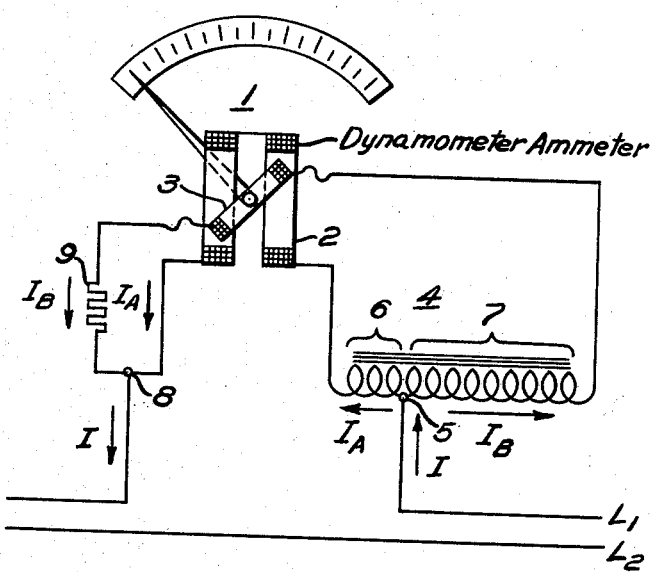
WITNESSES:                                    INVENTOR
                                              Carl Oman.
                                              BY
                                                  ATTORNEY Patented Aug. 6, 1940

2,210,685

UNITED STATES PATENT OFFICE 2,210,685

AMMETER

Carl Oman, East Orange, N. J., assignor to Westinghouse Electric & Manufacturing Company, East Pittsburgh, Pa., a corporation of Pennsylvania Application August 25, 1938, Serial No. 226,620

5 Claims. (Cl. 171—95)

This invention relates to a system for dividing the current flowing in a circuit into two predetermined portions, and it has particular relation to a system for supplying current to a shunted type of dynamometer ammeter.

The dynamometer ammeter, as is well known, comprises a stationary coil unit and a movable coil unit. For measuring moderate values of current, the current to be measured may be passed directly through these coil units connected in series. When higher values of current are to be measured, it becomes necessary to shunt a portion of the current through either or both of the dynamometer ammeter coil units in order to keep the dynamometer ammeter within practical limits.

Shunt units heretofore used have not been entirely satisfactory because of inaccuracies inherent in the prior constructions. The shunts were defective in that the ratio of the current derived from them to the main current varied because of changes in frequency, temperature or other variables.

I have found that a suitable shunting system may be employed wherein a current auto-transformer is associated with a circuit for dividing the current traversing the circuit into two portions which are used for energizing a dynamometer ammeter or any other desired device. Current transformers are available today which have a high degree of accuracy over wide ranges of frequency and secondary loading.

It is, therefore, an object of my invention to provide a system for dividing an electrical current into portions having a fixed and constant ratio.

It is a further object of my invention to provide an accurate system for energizing a shunted type of dynamometer ammeter.

It is another object of my invention to provide an accurate system for energizing a shunted type of dynamometer ammeter which is suitable for both alternating and direct currents.

Further objects of my invention will be apparent from the following description taken in conjunction with the accompanying drawing, which shows a diagrammatic view of an electrical circuit embodying my invention.

Referring to the drawing, I have illustrated a conventional type of dynamometer ammeter 1 which has a stationary coil unit 2 and a movable coil unit 3. This dynamometer ammeter is to be energized from a circuit L1, L2 by means of currents bearing predetermined ratios to the current flowing in the circuit. For this purpose, I employ an auto-transformer 4 which has a terminal 5 dividing the transformer into two portions 6 and 7. The portion 6 is connected in series with the stationary coil unit 2 to a second terminal 8, and the portion 7 of the transformer is connected in series with the movable coil unit 3 to the same terminal 8. Both terminals 5 and 8 are connected to the line conductor L1 of the circuit L1, L2. By reference to the drawing, it may be seen that two paths for current flow are provided for the current traversing the line conductor L1. One of these paths comprises the portion 6 of the transformer and the stationary coil unit 2. The other path comprises the second portion 7 of the transformer and the movable coil unit 3. The division of the current into these two paths is controlled by the constants of the auto-transformer 4, which in the preferred embodiment has a magnetic core, and these may be selected to give any desired ratio of currents. The division of the current I flowing in the line conductor L1 into portions $I_A$ and $I_B$ is illustrated by arrows in the figure. For alternating currents, these arrows represent an instantaneous direction of flow.

When employed for measuring alternating currents, the auto-transformer 4 may be designed to accurately divide the current I according to a predetermined ratio over a wide variation of frequency, but for direct-current measurements, the transformer action of the transformer is not available, and the division of current is dependent upon the resistances of the respective paths. If the ratio of the conductances of the two paths for direct current is made inherently substantially equal to the ratio of their conductances for alternating current, no further change is required, but if these ratios are not substantially equal, the measuring unit may be made available for direct current as well as alternating current measurements by including in one of the paths an auxiliary resistance 9, which is proportioned to bring the two ratios into equality. With the conductances of alternating current through the two paths fixed by the transformer, the addition of a suitable resistance 9 assures a similar division of direct current through the two paths. An adjustment of the resistance does not modify the accuracy of alternating current measurements for the reason that the transformer ratio determines the division of alternating currents.

Although I have illustrated my invention as applied to a dynamometer ammeter, it is obvious that it may be applied to various other devices having one or more actuating elements responsive to current, and that it is capable of numerous modifications. Therefore, I do not desire my invention to be restricted except insofar as is necessitated by the claims when interpreted in view of the prior art.

I claim as my invention:

1. In a system controlled by the current flowing in a circuit, a current auto-transformer for normally dividing said current in a predetermined substantially constant ratio into at least two paths, and a current-responsive device having a first actuating element energized in accordance with the portion of the current flowing in one of said paths, and having a second actuating element energized in accordance with the portion of the current flowing in the other of said paths.

2. In a system responsive to current flowing in a circuit, a current auto-transformer for dividing said current into a first path and a second path, and a dynamometer type of current-responsive instrument having a first coil unit connected in said first path and a second coil unit connected in said second path, said paths having a direct-current conductance ratio substantially equal to the alternating-current conductance ratio of said paths.

3. In a system responsive to current flowing in a circuit, a current auto-transformer for dividing said current into a first path and a second path, a dynamometer ammeter having a movable coil unit connected in said first path and a stationary coil unit connected in said second path, and a resistance connected in one of said paths for bringing the direct-current conductance ratio of said paths to a value substantially equal to the alternating-current conductance ratio of said paths.

4. In a measuring device for measuring either an alternating current or a direct current quantity present in an electrical circuit, a measuring instrument responsive to both direct current and alternating current, and means including inductively coupled windings for diverting through said measuring instrument an electrical quantity bearing a predetermined ratio, other than unity, both to an alternating current quantity and to a direct current quantity in an electrical circuit.

5. In a device for measuring current flowing in an electrical circuit, a current auto-transformer having a divided output for dividing current flowing in said electrical circuit into a plurality of paths each carrying less than the total current flowing in said electrical circuit, a measuring instrument substantially completely energized from the output of said current auto-transformer, and means for maintaining a division of direct current in said paths when said electrical circuit carries a direct current, which is substantially equal to the division of alternating current in said paths when said electrical circuit carries an alternating current, whereby the maximum current delivered to said measuring instrument is dependent on, but less than, the current flowing in said electrical circuit.

CARL OMAN.